United States Patent
Neuner

(10) Patent No.: US 7,163,096 B2
(45) Date of Patent: Jan. 16, 2007

(54) DOUBLE CLUTCH DRIVE WITH POSITION MAINTAINING FUNCTION

(75) Inventor: Josef Neuner, Raubling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 194 days.

(21) Appl. No.: 10/920,212

(22) Filed: Aug. 18, 2004

(65) Prior Publication Data

US 2005/0043141 A1 Feb. 24, 2005

(30) Foreign Application Priority Data

Aug. 21, 2003 (DE) ............... 103 38 355

(51) Int. Cl.
*F16D 48/02* (2006.01)
(52) U.S. Cl. .............. 192/87.1; 192/114 R; 477/906
(58) Field of Classification Search ............... None
See application file for complete search history.

(56) References Cited

U.S. PATENT DOCUMENTS

| | | | |
|---|---|---|---|
| 3,937,108 A * | 2/1976 | Will | 477/906 |
| 4,632,234 A | 12/1986 | Bardoll et al. | |
| 5,199,313 A * | 4/1993 | Muller | 192/85 R |
| 5,438,887 A * | 8/1995 | Simmons | 477/906 |
| 5,682,791 A * | 11/1997 | Liesener | 477/906 |
| 5,890,392 A | 4/1999 | Ludanek et al. | |

FOREIGN PATENT DOCUMENTS

| | | |
|---|---|---|
| DE | 42 08 060 A 1 | 10/1992 |
| DE | 43 16 784 C 2 | 11/1994 |
| DE | 196 31 983 C 1 | 2/1998 |
| DE | 199 39 334 A 1 | 3/2001 |
| DE | 199 50 679 A 1 | 4/2001 |
| DE | 100 43 060 A1 | 4/2002 |
| DE | 100 54 318 A 1 | 5/2002 |
| DE | 101 48 087 A 1 | 5/2002 |
| DE | 101 34 121 A1 | 10/2002 |
| DE | 101 38 395 A 1 | 2/2003 |
| DE | 102 18 049 A 1 | 11/2003 |
| WO | WO 97/42428 | 11/1997 |
| WO | WO 03/074895 A2 | 9/2003 |
| WO | WO 2003/074895 A3 | 9/2003 |

* cited by examiner

*Primary Examiner*—Rodney H. Bonck
(74) *Attorney, Agent, or Firm*—Crowell & Moring LLP

(57) ABSTRACT

A double clutch drive has a first and a second clutch, wherein for normal operation for the closing and opening of the first clutch a first hydraulic device governed by an electronic control is provided, and for the closing and opening of the second clutch a second hydraulic device is provided. Also, a position-holding hydraulic device is provided to which position signals are delivered corresponding to the momentary position of the first and second clutch, and which is connected via hydraulic control lines with the first and second hydraulic device, while in the event of a failure of the electronic control the position-holding hydraulic device hydraulically operates the first and the second hydraulic control such that, at least in many positions of the clutches, the clutch positions that are present immediately prior to the failure of the electronic control are sustained.

17 Claims, 4 Drawing Sheets

DOUBLE CLUTCH DRIVE WITH POSITION MAINTAINING FUNCTION

This application claims the priority of German Patent Document DE 103 38 355.7, the entire disclosure of which is herein incorporated by reference.

SUMMARY OF THE INVENTION

The present invention relates to a double clutch drive.

DE 199 50 679A1 discloses an automated double clutch drive. Double clutch drives usually have two coaxially arranged drive input shafts, each having a separate friction clutch and a set of speed steps. Usually one set has speed steps with an odd order number and the other group speed steps with an even order number. One advantage of double clutch drives is that shifting is possible without interrupting the driving force. In a shifting procedure, first the desired "target speed" is engaged, wherein the clutch of the target speed is first opened. Then the clutch of the target speed is closed and simultaneously the speed actually engaged is opened. The operation of the clutches is usually performed electrohydraulically in double clutch drives with "wet" clutches. In the event of failure or trouble in the electronics, in many double clutch drives the electrohydraulic control shifts into a basic state in which both clutches are opened, resulting in an interruption of the drive regardless of the driving situation; since the vehicle only coasts in the event of the electronic failure, the driver is not forewarned, and he cannot properly park the vehicle.

It is an object of the invention to create an double clutch drive with an eye towards the above-stated problems. This task is accomplished by the invention described and claimed hereinafter.

The invention sets out from a double-clutch drive which has a first and a second clutch. While for normal operation a first electronically controlled hydraulic device is provided for closing and opening the first clutch, and a second electronically controlled hydraulic device for closing and opening the second clutch. The invention is based on the idea that the positions of the clutches immediately prior to failure of the clutch control or electronic means are to be sustained at least in many of the states of operation of the clutches. To achieve this, a double clutch drive according to the invention has a "position-holding hydraulic control." Position signals or pressure signals corresponding to the momentary states of the first and second clutches are delivered to the position-holding hydraulic control via a first and a second hydraulic line. Moreover, hydraulic control lines are provided which extend from the position-holding hydraulic control to the first and to the second hydraulic position-holding hydraulic control. In the event of a failure of the clutch control or the electronic system, the position-holding hydraulic control, at least in many of the "starting operating positions of the clutches," controls the first and the second hydraulic system via the hydraulic control lines such that the positions of the clutches immediately prior to the failure are maintained.

According to one aspect of the invention, whenever one of the two clutches is closed and the other clutch is open and the electronic control breaks down, these clutch positions are sustained by the position-holding hydraulic system. Thus, in the event of a breakdown of the electronic control, the driver can move or park the vehicle by "emergency operation."

In the case of a slipping clutch, i.e., a clutch which is neither entirely open nor entirely closed, it is possible to provide such that the slipping clutch will be opened or closed in the event of failure of the electronic control.

According to another aspect of the invention, a slipping clutch is closed in the event of failure of the electronics only if a supply pressure is present at a supply input of the position-holding system. It can be arranged that the pressure present at the supply input in a vehicle depends on the rotating speed of the vehicle's engine. For example, a supply pressure is present at the supply input of the position-holding hydraulic device only when the speed of the engine or the speed of a hydraulic pump exceeds a given minimum rpm, or when a hydraulic volumetric flow of the hydraulic system exceeds a predetermined value. Therefore a slipping clutch is closed in the event of a failure of the electronic system if one of the above-mentioned criteria is satisfied. If none of the above-named criteria is satisfied, provision can be made for a slipping clutch to be opened. Thus the assurance can be given that, for example, if the vehicle is standing still and the electronic system fails, the driver will not be startled by a clutch "snapping shut."

According to still another development of the invention, the first and the second hydraulic system each have a first and second electrohydraulic pressure control and a first and second control valve, respectively. A hydraulic control input of the first and second pressure control is connected to a control input of the first and second control valve, respectively. The control valves furthermore have a connection through which they are supplied with working pressure and a control output which is connected to the associated first or second clutch.

According to yet another development of the invention, the control valves in a basic state, that is, in a state wherein there is no pressure in their control inputs, cuts the control output off from the working pressure. Whenever a control valve is in the basic state, the associated clutch is opened.

As already mentioned, position signals corresponding to the momentary position of the first and second clutch are fed to the position-holding hydraulic system via the first and second hydraulic lines, respectively. The first and second hydraulic line can be connected to the control output of the first and second control valve, respectively.

Alternatively, the control valves, in addition to the control output to which the associated clutch is connected, can each have a separate signal output to which the associated first or second hydraulic line is connected. In this case it can be arranged that, when the control valves are operated by the associated pressure regulator, working pressure is put through to the signal output, and this is done before working pressure is applied to the control output of the control valve and to the clutch connected with it. Clearly, therefore, the "control edge" of the signal output opens just before the control edge of the control output of the control valve, as will be again explained in greater detail later.

According to a further aspect of the invention, the position-holding hydraulic system is supplied with working pressure through a solenoid valve operated by the electronic system. In normal operation—that is, whenever the electronic system is operating properly—the solenoid valve is energized. In this active state, the solenoid valve blocks the position-holding hydraulic system against the working pressure. In the event of failure of the control electronics the solenoid valve shifts to its basic state. In the basic state the solenoid valve is opened and lets the working pressure pass to the position-holding hydraulic system. In "emergency operation" the position-holding hydraulic system is supplied, therefore, with working pressure and can operate the second hydraulic through the hydraulic control lines so that the clutch positions that were present before the failure of the electronics remain held.

According to a still further aspect of the invention, the position-holding hydraulic system has a control piston which is arranged for displacement in a housing of the position-holding hydraulic system. The position of the control piston depends on the pressure prevailing in the first and second hydraulic line. The pressures prevailing in the first and second hydraulic line correspond to the shift positions of the two clutches. By the pressure fed through the first hydraulic line the control piston can be shifted in a first direction, and by the pressure delivered through the second hydraulic line the control piston can be shifted in a second direction. In a first position of the control piston, the first hydraulic control line, which is connected to the hydraulic system, is shut off against the solenoid valve, i.e., against the working pressure present during emergency operation at the output from the solenoid valve. In a second position of the control piston, however, the second hydraulic control line is shut off from the solenoid valve.

The control piston furthermore has a basic position. It can be arranged that, when the control piston is in the basic position, the pressures in the first and second hydraulic lines just cancel one another, or that the two pressures are zero. When the control valve is in the basic position the position-holding hydraulic system blocks the pressure coming from the solenoid valve from both control lines, the result being that both clutches are without pressure and remain open.

According to a yet further aspect of the invention, it is arranged that, whenever no pressure is present at the first and at the second hydraulic line, or when the pressures prevailing in the first and second hydraulic lines just cancel one another, the control piston is forced by two compression springs acting in opposite directions to the basic position wherein both of the hydraulic control lines are shut off from the solenoid valve by the control piston.

According to a still yet further aspect of the invention, the control piston of the position-holding hydraulic system is biased such that it can be shifted from its basic position to its first or to its second position only if the difference between the pressures in the first and second hydraulic control lines exceeds a given "difference threshold."

According to a further aspect of the invention, between the solenoid valve and the position-holding hydraulic system, a valve is arranged which in a basic state blocks the fluid connection between the solenoid valve and the position-holding hydraulic system, and opens the fluid connection between the solenoid valve and the position-holding hydraulic system only if the volumetric flow through the solenoid valve exceeds a given level. The given level corresponds to a certain output of a hydraulic pump or a specific motor speed. That is to say, the position-holding valve is supplied with pressure in the event of failure of the electronic system whenever the motor speed, when idling for example, connects no pressure to the position-holding valve and consequently, in the event of failure of the electronic system at low motor speeds, neither of the two clutches is closed.

BRIEF DESCRIPTION OF THE DRAWINGS

The invention is explained below in conjunction with the drawing, wherein.

DETAILED DESCRIPTION OF THE DRAWINGS

Figure 1:
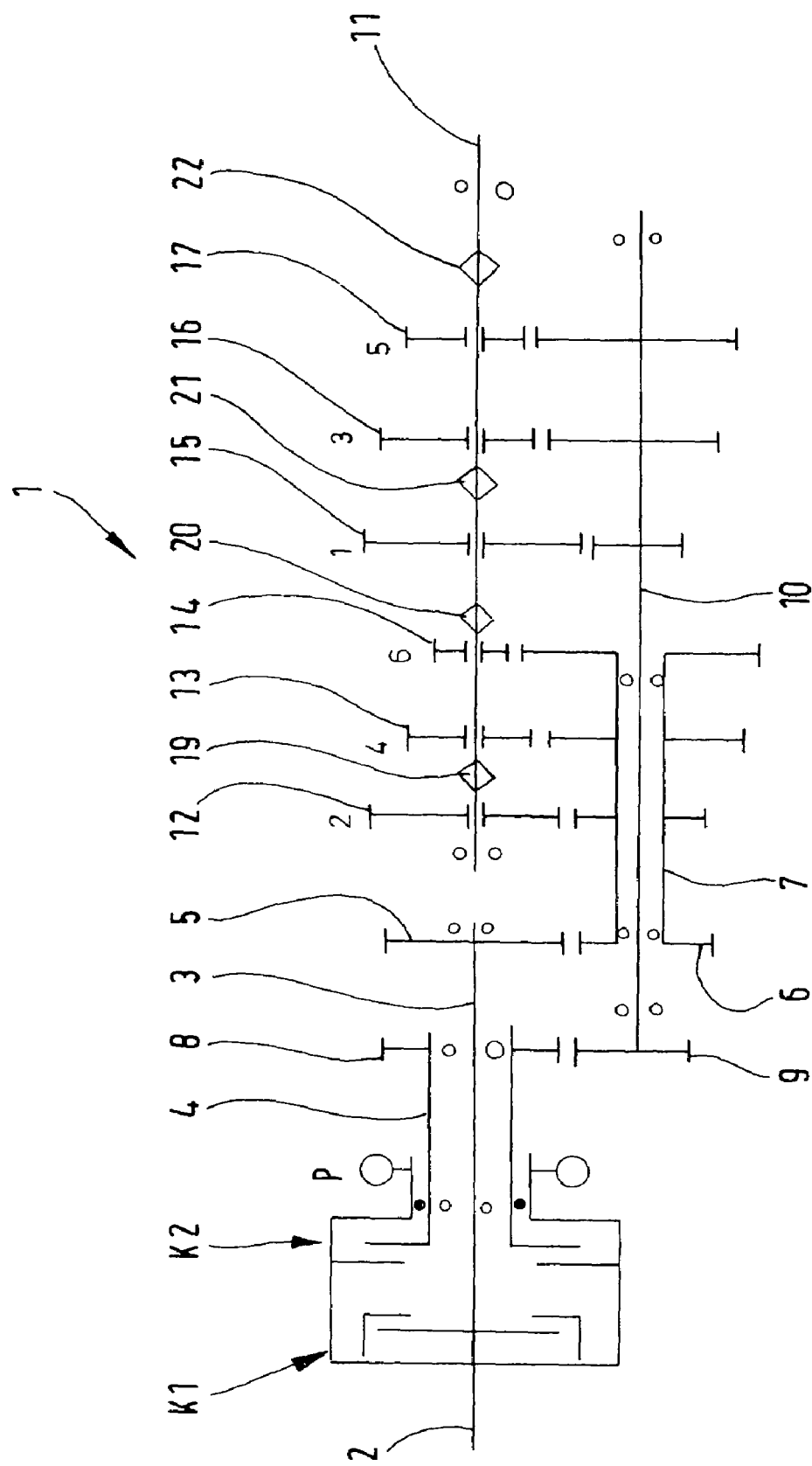
FIG. 1 shows the basic principle of a double clutch drive schematically represented.

FIG. 1 shows a double clutch drive 1 with a drive shaft 2, a first clutch K1 and a second clutch K2. The drive shaft 2 can be coupled with a shaft 3 via the first clutch K1. A hollow shaft 4 disposed coaxially with the shaft 3 can be coupled with the drive shaft 2 by the second clutch K2.

A gear 5 on the shaft 3 meshes with a gear 6 of a first countershaft 7 in the form of a hollow shaft. A gear 8 of the hollow shaft 4 meshes with a gear 9 of a second countershaft 10.

Furthermore, a drive shaft 11 is provided, on which loose wheels 12–18 are disposed for rotation and can be coupled by sliding muffs 19–22 to the drive shaft 11.

The loose wheels 15, 16, 17 form the "odd" speeds 1, 3, 5. Loose wheels 12, 13, 14 form the "even" speeds. If, for example, the first speed is engaged and is to be shifted to the second speed, the clutch K2 is closed and clutch K1 is opened. With clutch K1 open the second speed can be engaged simultaneously to the first speed. Then clutch K1 is closed and clutch K2 is simultaneously opened, which permits engagement without interrupting the drive force.

When a shift is performed to the next higher or next lower speed, therefore, both clutches K1 and K2 are simultaneously operated, one of the two clutches always being opened and the other closed. The operation of clutches K1 and K2 is performed by an electrohydraulic control, which will be further explained in connection with the next figures.

Figure 2:
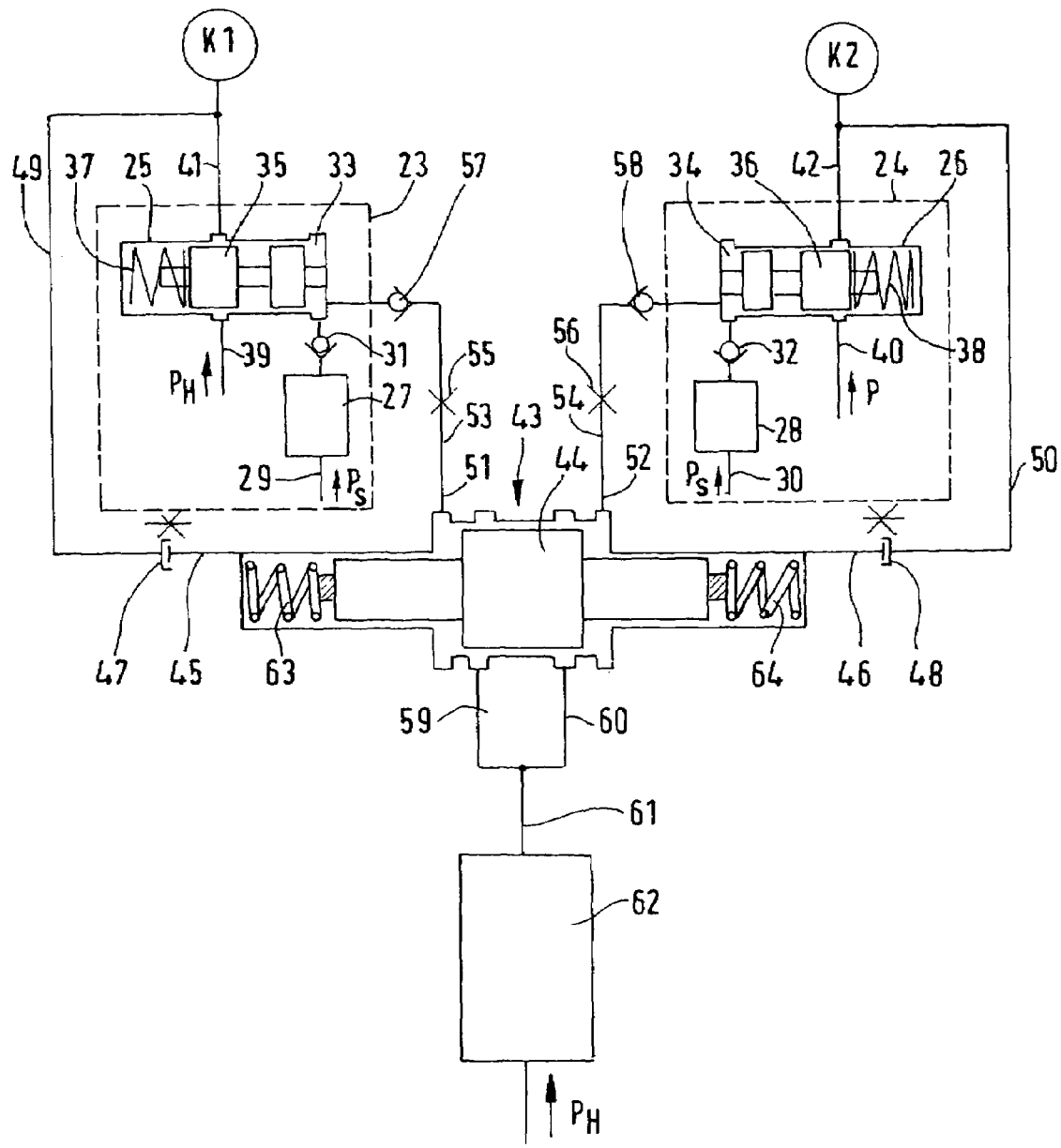
FIG. 2 shows the circuit for control of the two clutches of the two double clutch drive.

FIG. 2 shows an electrohydraulic control for the operation of the two clutches K1 and K2. In normal operation, clutch K1 is operated by a first hydraulic control 23 and clutch K2 by a second hydraulic control 24. The first and second hydraulic controls 23 and 24 are here of identical construction, each having a control valve 25 and 26, and a pressure regulator 27 and 28, respectively. The pressure regulators 27 and 28 are supplied with a control pressure $P_s$. The pressure regulators 27 and 28 are connected in each case through a check valve 31, 32, with a control input 33, 34 of the associated control valve 25, 26.

The control valves 25, 26 have each a housing with a double piston 35, 36 arranged for displacement therein, which is biased by a spring 37, 38 toward the control input 33, 34. The control valves 25, 26 furthermore have an input 39 and 40, respectively, for a main pressure and a control output 41, 42, which is connected with the clutch K1 and K2, respectively.

In normal operation the pressure regulators 27, 28 are electrically operated. A specific hydraulic pressure is delivered into the control inputs 33, 34 according to the current flowing through the pressure regulators 27, 28. The control pistons 35, 38 are thereby shifted against the force of springs 37 and 38, respectively.

In the base position here shown, the pressure regulators 27, 28 are not under power, and no pressure or only a very low pressure is delivered to the control inputs 33, 34, with the result that the control pistons 35, 36 are forced by the springs 37 and 38, respectively, to their end position. In the end positions the input 39, 40 is shut off from the control output 41, 42. When the pressure regulators 27 and 28 are not under power, then the clutches K1 and K2 are opened.

As already mentioned, in the event of a failure of the control circuit, i.e., in the event of a failure of the electronic control system that operates the pressure regulators 27, 28, at least in many of the situations of the clutches, it is an important aim of the invention to sustain the positions which the clutches K1 and K2 had just before the failure occurred. To this end, a position-holding valve 43 is provided. The position-holding valve 43 has a housing with a control piston 44 arranged for displacement therein. The position-holding valve 43 furthermore has two pressure inputs 45, 46, which are connected through a choke point 47, 48 and a first and second hydraulic line 49, 50 to the control output 41 of the first control valve 25 and the control output 42 of the second control valve 26. The position-holding valve 43 furthermore has control outlets 51, 52 which through hydraulic control lines 53, 54 in which a choke point 55, 56 and a check valve 57, 58 are provided. The position-holding valve 43 is connected via the hydraulic control lines 53, 54 to the control input 33 of the first control valve 25 and with the control input 34 to the second control valve 26.

The position-holding valve 43 furthermore has two inputs 59, 60 which are connected with one output 61 of a solenoid valve 62, the solenoid valve 62 being supplied with a main pressure $P_H$. In normal operation the solenoid valve is powered and cuts the output 61 from the main pressure $P_H$. In the event of a failure of the power supply or control system the solenoid valve 62 passes into its basic state and passes the main pressure to the outlet 61 and to the inputs 59, 60 of the position-holding valve 43.

As it appears from FIG. 2, the two opposite ends of the control piston 44 of the position-holding valve 43 are each biased by a compression spring. When no pressure is present in the hydraulic lines 49, 50, or when the pressures cancel one another, then the compression springs 63, 64 force the control piston 44 into the base position here shown. In the base position the control piston 44 cuts off the inputs 59, 60 from the control outputs 51, 52.

Starting from a condition in which, for example, clutch K1 is closed and clutch K2 is open, in the event of failure of the electronic control the control valve 25 would return to the base condition here shown, which would lead to a drop of pressure at the clutch K1 and an opening of clutch K1. The control pressure at the clutch K1 before failure of the electronic control is present at the input 45 to the position-holding valve through the first hydraulic line 49. With clutch K1 closed, this pressure is greater than the pressure present at the inlet 46, the result being that, with clutch K1 closed and clutch K2 open, the control piston 44 of the position-holding valve 43 is shifted to the right. In this situation the inlet 60 is shut off from the output 51. In case of a failure of the electronic control, the solenoid valve 62 also changes over to its basic condition, with the result that the main pressure $P_H$ is passed through the outlet 61, the inlet 59 to the output 51 and on to the control input 33 of the control valve 25. The control piston 35 of the control valve 25 is thus held in its original state even if the electronic control drops out, that is to say, the main pressure $P_H$ present at inlet 39 is put through to the outlet 41 to clutch K1, with the result that the clutch K1 remains closed. Clutch K2 also remains in its starting condition. It remains open.

In like manner, the starting condition remains if the clutch K1 opens and clutch K2 is closed and a failure of the electronic control occurs.

Setting out from a starting condition in which both clutches K1 and K2 are open, i.e., in which the pressure regulators 27, 28 are not energized, the control pistons 35, 36 of the control valves 25, 26 are in the basic state here shown.

Thus zero pressure or an equal pressure is present at the inputs 45, 46 of the position-holding valve 43. Consequently, the control piston 44 is in the middle position shown here, in which the inputs 59, 60 are shut off by the control piston 44. In case of a breakdown of the electronic control, the solenoid valve 61 does open, but the pressure present at the inputs 59, 60 is shut off by the control piston 44 from the control inputs 33, 34 of the control valves 25, 26, so that there is no change in the "starting position" of the control valves 25, 26.

The position-holding valve is here so designed that the control piston 44 is shifted to the right or to the left only when the pressure difference in the first and second hydraulic line 49, 50 and at the inputs 45, 46 exceeds an established difference in pressure. If, for example, clutch K2 is open and clutch K1 is only lightly applied, then a lower pressure prevails in the first hydraulic line 49 than when clutch K1 is fully closed. The position-holding valve 43 is so designed that when a clutch is only lightly applied, the clutch pressure, that is, the pressure prevailing in the first hydraulic line 49, is not sufficient to displace the control piston 44. That is, when clutch K2 is open and clutch K1 is just lightly slipping and the electronic control then drops out, clutch K1 does not fully close but is opened, since the control piston 44 remains in its middle position and the inputs 59, 60 remain shut off from the control inputs 33, 34 of the control valves 25, 26. In the embodiment shown in FIG. 2, then, the piston 44 is shifted right or left only if the normal working pressure prevails in one of the two control lines 49, 50 and one of the two clutches K1 or K2 is closed.

Figure 3:
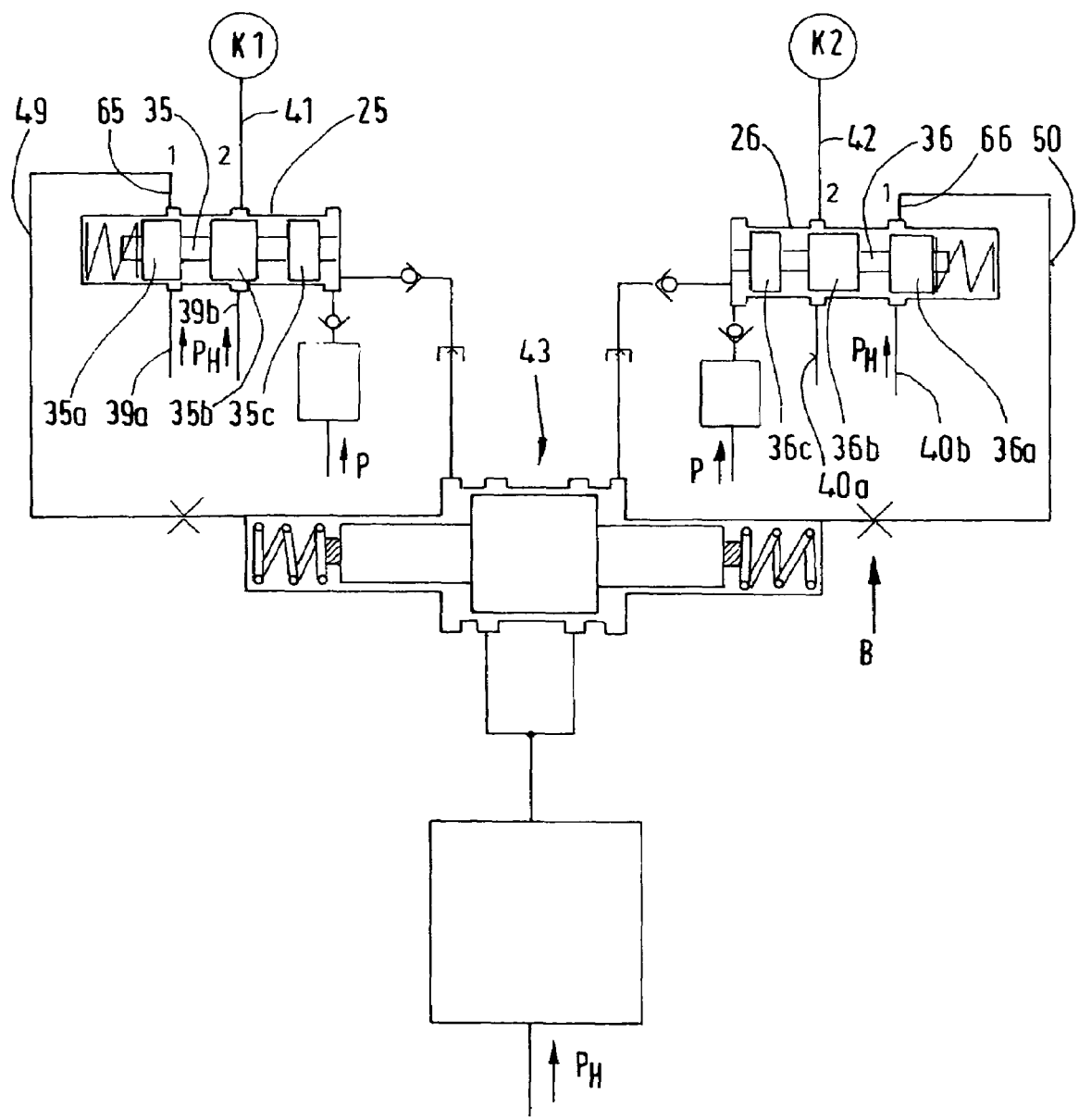
FIG. 3 shows a variant of the embodiment of FIG. 2, wherein the control valves have a separate signal output.

FIG. 3 shows a variant of the embodiment of FIG. 2. The control pistons 35, 36 of control valves 25, 26 here have three piston sections 35a, 35b, 35c and 36a, 36b, 36c. Also, two inputs are provided for the main pressure, 39a, 39b and 40a, 40b, respectively. In addition to the control output 41 and 42, the control valves 25, 26 have a separate signal output 65 and 66, respectively. The first hydraulic line 49 is connected to signal output 65 and the second hydraulic line 50 to signal output 66.

It is important in this embodiment that the control edge of piston section 35a opens just before the controlling edge of piston section 35b. Accordingly, the controlling edge of piston section 36a opens just before the control edge of piston section 36b. Unlike the embodiment of FIG. 2, therefore, even when a clutch is slipping, i.e., at a low clutch pressure, the working pressure $P_H$ acts through the slightly sooner opening control edge of piston sections 35a and 35b and through the first and second hydraulic lines 49 and 50 to the position holding valve 43. In case of failure of the electronic control, therefore, a slipping clutch is closed, not opened as in FIG. 2.

Otherwise the operation of the embodiment of FIG. 3 is the same as that of the embodiment of FIG. 2.

Figure 4:
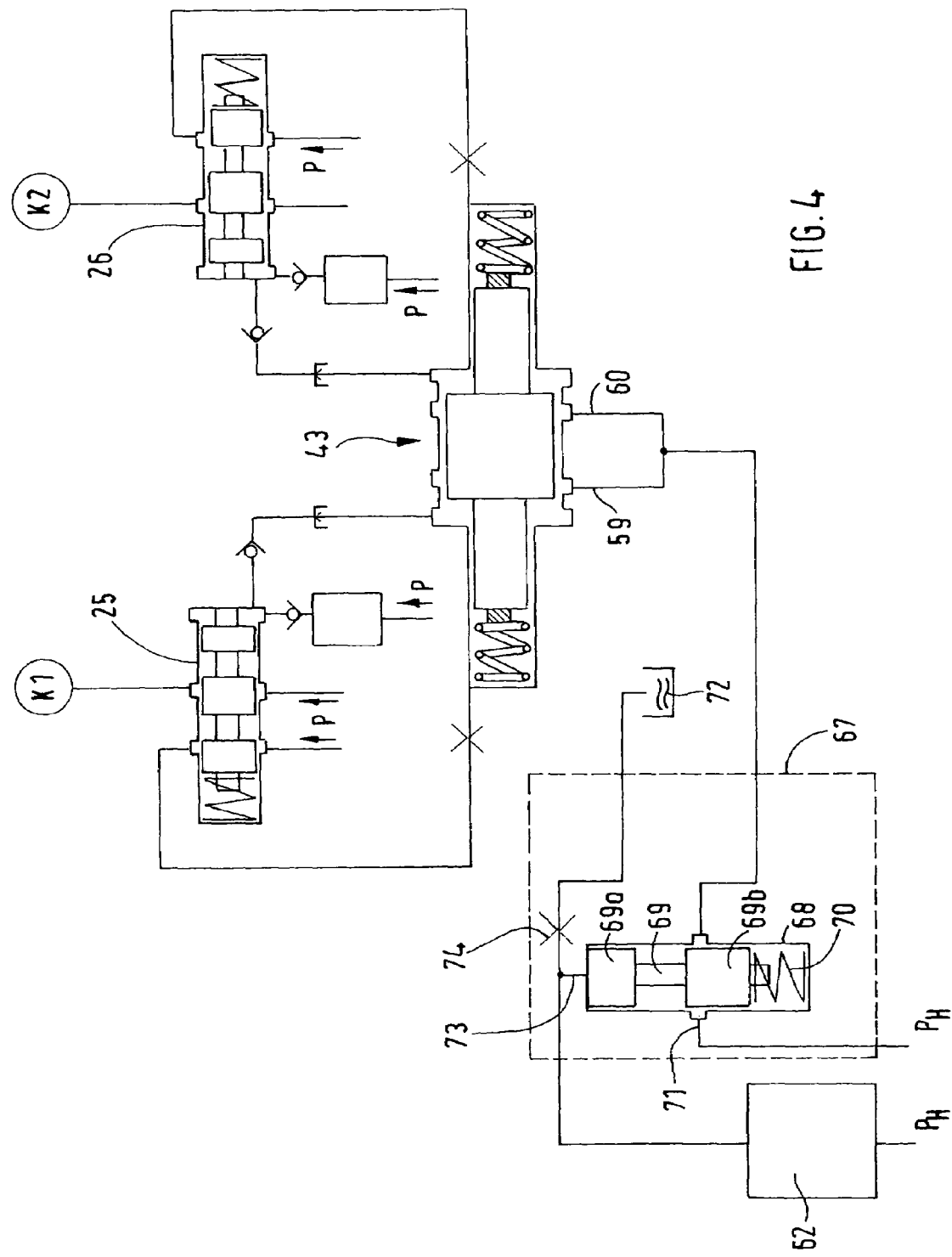
FIG. 4 shows an embodiment with leakage control.

FIG. 4 shows a variant of the embodiment of FIG. 3, in which a "leakage control" 67 is additionally provided. It is expressly pointed out that such leakage control can also be provided in the embodiment described in FIG. 2.

The leakage control 67 has a valve 68 with a piston 69. The piston 69 is a double piston and has two piston sections 69a, 69b. Piston 69 is biased by a compression spring 70 to the upper position here illustrated, which is the basic state of the valve. In the basic state of valve 68 a valve inlet 71 at which the main pressure $P_H$ is present is shut off from the inlets 59, 60 of the position holding valve 43 by piston section 69b. In normal operation, that is, when the electronic control is operating properly, power is applied to the solenoid valve 62. In the powered state the solenoid valve 62 shuts the main pressure $P_H$ off from an oil sump 72 and a control inlet 73 of valve 68. In a breakdown of the electronic control, the solenoid valve 62 shifts to its basic state in which it is open. As a result, a volume flow passes through the solenoid valve 62. The volume flow passes through a choke 74 to the oil sump 72. Furthermore, an oil pressure develops at the control input 73, which shifts piston 69 against the force of compression spring 70, with the result that the main pressure $P_H$ at inlet 71 is switched to the inputs 59, 60 of the position-holding valve 43.

The operation of the leakage control 67 will now be further explained. If the electronic control has failed, in case of a low engine speed of, e.g., 500–1500 rpm, the volume flow passing through the solenoid valve 62 is not sufficient to produce a sufficiently high pressure at inlet 73 needed for shifting the piston 69. Only at higher engine speeds or only at higher rpm of the hydraulic pump (not shown) will a sufficiently high pressure for the displacement of the piston 69 be produced at the inlet 73. When the vehicle is standing, when the engine is running at idle speed, the working pressure $P_H$ will not be applied to the inlets 59, 60. Consequently, when the motor is idling or slowly running the clutches K1 and K2 are or become open.

What is claimed is:

1. A double clutch drive comprising:
    a first and a second clutch;
    a first electronically activated hydraulic device for closing/opening the first clutch;
    a second electronically activated hydraulic device for closing/opening the second clutch;
    a position-holding hydraulic device to which position signals corresponding to a momentary shifted position of the first and second clutch are sent through a first and a second hydraulic line, and which is connected through hydraulic control lines with the first and second hydraulic device, wherein the position-holding hydraulic device operates the first and the second hydraulic device such that positions of the clutches immediately before a failure of electronic control remain sustained.

2. The double clutch drive according to claim 1, wherein the position-holding hydraulic device, in the event of the failure of electronic control, keeps open a clutch that was open before the failure and keeps closed a clutch that was closed before the failure.

3. The double clutch drive according to claim 1, wherein the first hydraulic device has a first electrohydraulic pressure regulator and the second hydraulic device has a second electrohydraulic pressure regulator, wherein while a hydraulic control output of the first pressure regulator is connected to a control inlet of a first control valve and a hydraulic control output of the second pressure regulator is connected to a control inlet of a second control valve, and wherein the control valves is supplied with a working pressure and each have a control outlet which is connected with the associated first or second clutch.

4. The double clutch drive according to claim 3, wherein the control valves are pressure-less in a basic state in which their control inputs are pressureless, and shut off the working pressure from the control output so that with the control valves in the basic state the associated clutch is opened.

5. The double clutch drive according to claim 3, wherein the first and second hydraulic lines are connected to the control outputs of the first or second control valves, respectively.

6. The double clutch drive according to claim 3, wherein the control valves, in addition to the control outputs to which the associated clutches are connected, each have a separate signal output to which the associated first or second hydraulic line is connected, while in case of an actuation of the control valves by the associated pressure regulators, working pressure is delivered to the signal outlet, just before working pressure is connected to the control output and to the clutch connected the control output.

7. The double clutch drive according to claim 1, wherein the position-holding hydraulic device is supplied with working pressure through a solenoid valve controllable by the electronic control, the solenoid valve being supplied with electrical power in normal operation and the position holding hydraulic control is shut off from the working pressure in normal operation and, in case of the failure of electronic control, the solenoid valve is opened and admits working pressure to the position-holding hydraulic device.

8. The double clutch drive according to claim 7, wherein the position-holding hydraulic device has a control piston which is displaceable in a first direction by the pressure fed through the first hydraulic line and in a second direction by the pressure fed through the second hydraulic line, and which in a first position shuts off the first control line from the solenoid valve, in a second position shuts the second hydraulic control line from the solenoid valve, and in a base position shuts off the pressure coming from the solenoid valve from both hydraulic control lines.

9. The double clutch drive according to claim 8, wherein the control piston, whenever no pressure or in each the same pressure is present at the first and at the second hydraulic line, is forced into the base position by two compression springs acting in opposite directions.

10. The double clutch drive according to claim 9, wherein the control piston is so biased that it is displaceable from its base position to its first or to its second position only when the difference between the pressures in the first and second hydraulic line exceeds a preset value.

11. The double clutch drive according to claim 7, wherein a valve is arranged between the solenoid valve and the position-holding hydraulic device and in a base condition blocks the fluid connection between the working pressure and the position-holding hydraulic device, and opens the fluid connection between the working pressure and the position-holding hydraulic device only when, in the even of a failure of the electronic control, a volume current flowing through the solenoid valve exceeds a preset volume current, the present volume current corresponding to an output of a hydraulic pump or to a motor speed.

12. The double clutch drive according to claim 1, wherein a choke point is provided in the first and in the second hydraulic line.

13. A double clutch drive comprising:
    a first and second clutch;
    a first electronically activated hydraulic device for closing/opening the first clutch;
    a second electronically activated hydraulic device for closing/opening the second clutch;
    a position-holding hydraulic device to which position signals corresponding to a momentary shifted position of the first and second clutch are sent through a first and a second hydraulic line, and which is connected through hydraulic control lines with the first and second hydraulic device,
    wherein the position-holding hydraulic device operates the first and the second hydraulic device such that, in the event of the failure of electronic control, a clutch that was slipping before the failure is opened.

14. A double clutch drive comprising:
    a first and a second clutch;

a first electronically activated hydraulic device for closing/opening the first clutch;

a second electronically activated hydraulic device for closing/opening the second clutch;

a position-holding hydraulic device to which position signals corresponding to a momentary shifted position of the first and second clutch are sent through a first and a second hydraulic line, and which is connected through hydraulic control lines with the first and second hydraulic device, wherein the position-holding hydraulic device operates the first and the second hydraulic device such that, in case of the failure of electronic control, a clutch that was slipping before the failure is closed.

15. A double clutch drive comprising:

a first and a second clutch;

a first electronically activated hydraulic device for closing/opening the first clutch;

a second electronically activated hydraulic device for closing/opening the second clutch;

a position-holding hydraulic device to which position signals corresponding to a momentary shifted position of the first and second clutch are sent through a first and a second hydraulic line, and which is connected through hydraulic control lines with the first and second hydraulic device, wherein the position-holding hydraulic device operates the first and the second hydraulic device and, in the event of the failure of electronic control, a clutch that was slipping before the failure is closed only if a supply pressure is present at a supply inlet of the position-holding hydraulic device.

16. The double clutch drive according to claim 15, wherein the double clutch drive is a transmission of a motor-powered vehicle and the supply inlet of the position-holding hydraulic device, in the event of the failure of electronic control, is fed with the supply pressure only if the speed of the motor exceeds a given rpm, so that a clutch that was slipping before the failure, is closed only when the speed of the motor exceeds the given rpm and is opened only when the speed at the failure of electronic control is smaller than the preset speed.

17. A method for making a double clutch drive, comprising:

providing a first and a second clutch;

providing a first electronically activated hydraulic device for closing/opening the first clutch;

providing a second electronically activated hydraulic device for closing/opening the second clutch;

providing a position-holding hydraulic device to which position signals corresponding to a momentary shifted position of the first and second clutch are sent through a first and a second hydraulic line, and which is connected through hydraulic control lines with the first and second hydraulic device, wherein the position-holding hydraulic device operates, in many positions of the clutches, the first and the second hydraulic device such that positions of the clutches immediately before a failure of electronic control remain sustained.

* * * * *